Oct. 10, 1939.  H. D. VALLE  2,175,543
HOUSEHOLD DOUGHNUT-FORMING MACHINE
Filed June 27, 1939
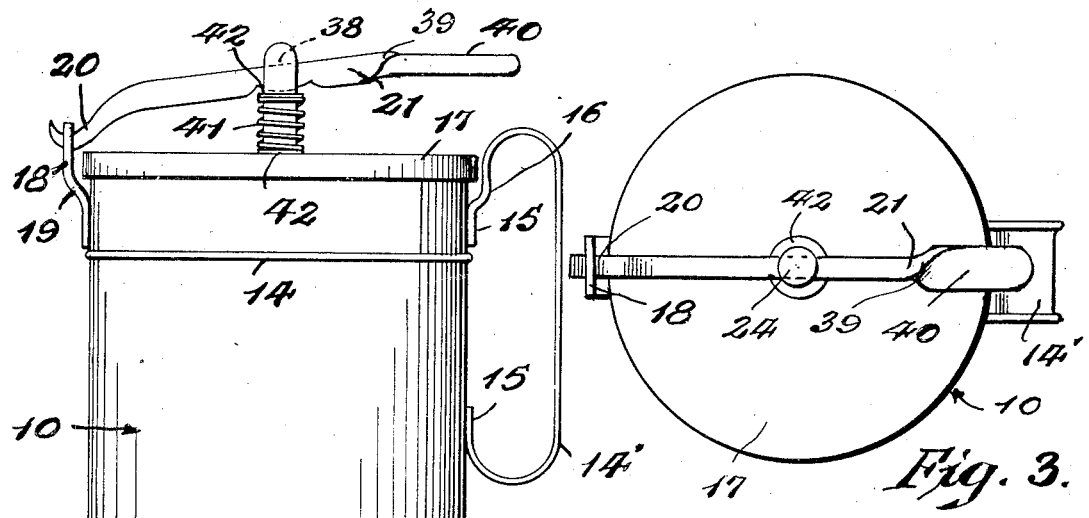
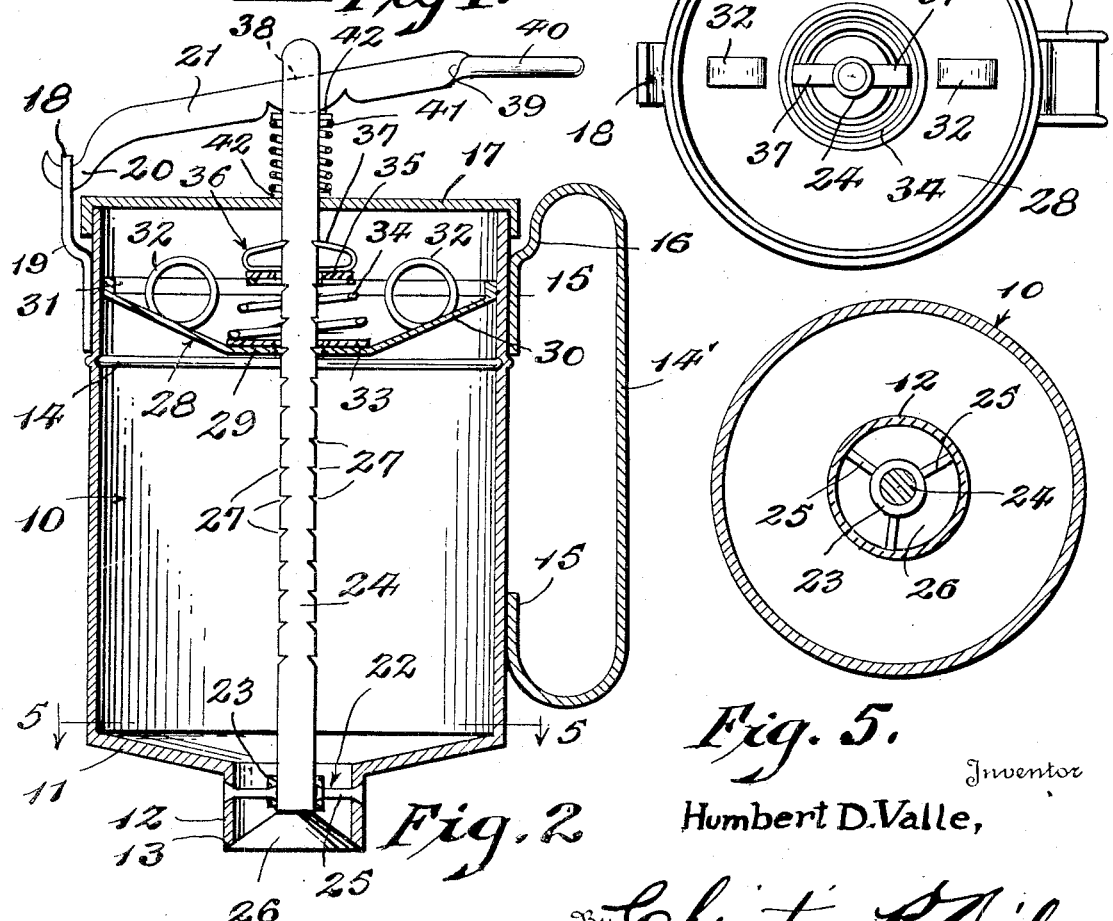
Inventor
Humbert D. Valle,
By Christian R. Nielsen
Attorney Patented Oct. 10, 1939

2,175,543

UNITED STATES PATENT OFFICE 2,175,543

HOUSEHOLD DOUGHNUT-FORMING MACHINE

Humbert Della Valle, Philadelphia, Pa.

Application June 27, 1939, Serial No. 281,480

7 Claims. (Cl. 107—14)

This invention relates to a doughnut forming machine and it consists in the constructions, arrangements and combinations herein described and claimed.

It is an object of the invention to provide a machine of simple construction and operation, lending itself suitably for domestic use where a small number of doughnuts will be made at a time; the machine being so constructed that it will accurately form the doughnut and deliver the formed doughnut into a cooking vessel.

It is also an object of the invention to provide a machine which may be held and manually operated by one hand and to this end, a novel operating handle and dough pressure means is presented.

It is also an object of the invention to provide a machine of the type described, in which the various parts are assembled without the use of bolts, rivets or the like, thus presenting a machine which may be readily cleaned and liable in a minimum degree to derangement.

Additional objects, advantages and features of invention will be apparent from the following description considered in conjunction with the accompanying drawing, wherein Figure 1 is a side elevation of the doughnut machine.

Figure 2 is an enlarged vertical section thereof.

Figure 3 is a top plan view.

Figure 4 is a similar view with the cover removed.

Figure 5 is a cross section on the line 5—5 of Figure 1.

There is illustrated a container 10 which may be formed from any suitable gauge sheet metal and of any size desired. The container 10 is open at the top and the bottom and is formed with a tapering funnel-like wall 11, the latter merging into a cylindrical nozzle 12 in the medial longitudinal axis of the container. The lower edge of the nozzle 12 is preferably formed with an inclined edge 13 complemental to a cut-off means presently to be described.

At a suitable point adjacent the upper end of the container 10, there is formed a bead 14 circumscribing the container, functioning as a guide means when filling the container with batter.

Upon one side of the container there is secured a handle 14', which is in the form of an elongated loop readily fitting the hand of an operator, respective ends 15 of the loop seating flush against the container and fixed thereto by welding. The upper end 15 is slightly offset as at 16 providing ample clearance for a cover 17 when applied to the open upper end of the container.

At a point diametrically opposite the handle 14', an upstanding lug 18 is provided, welded to the container. The lug 18 is also offset as at 19 for accommodation of the cover 17, and the upper end of the lug is apertured for reception of a hook member 20 of an operating lever 21, as will be presently described.

Positioned within the nozzle 12 inwardly of the outer end there is a spider 22 having an annular boss 23 providing a slide fit for a rod 24, as will be described hereinafter. The spider 22 in the present instance comprises three rods 25, one end of the rods being fixed by peening or otherwise, in the wall of the nozzle 12, the other end of the rods being similarly secured in the boss 23. Preferably, the rods 25 are radially disposed at an angle of approximately 120 degrees, thereby providing ample clearance for extrusion of batter.

The rod 24 has rigidly formed therewith a cone 26, the sides thereof being so shaped as to snugly contact the inclined edge 13 of the nozzle, when the rod 24 and cone 26 are in their uppermost or inoperative positions.

The rod 24 is provided upon opposed sides with a plurality of equally spaced notches 27, the notches being positioned along the rod from a point adjacent its lower end to a point below the cover 17.

Within the container 10 there is a follower 28, in the present instance being constructed as an annular disk having a medial horizontal portion 29 from which an upwardly inclined wall 30 is extended, the wall 30 terminating in an upstanding flange 31 of a size slidably fitting the walls of the container. At suitable opposed points upon the upper side of the wall 30, there are provided a pair of loops 32, welded to the wall, the loops forming suitable gripping means for reception of fingers of an operator for withdrawing the follower.

The horizontal portion 29 is apertured centrally thereof to receive the rod 24 therethrough, and this portion affords support for a washer 33.

A tapering helical spring 34 is secured to the lower helix of the washer 33, and a washer 35 is fixed to the upper helix of the spring. The washer 35 in turn has fixed thereon a spring clip 36, the latter having a central aperture aligned with the aperture of the washer 35. This assembly receives the rod 24 therethrough, for a purpose as will presently appear.

The spring clip 36 has a pair of arms 37 directed inwardly toward the rod 24 of a length to engage in respective opposed pairs of notches 27.

The cover 17 is centrally apertured and receives the rod 24 therethrough, the upper end of the rod terminating above the cover and has a slot 38 through which the lever 21 passes. The lever 21 passes edgewise through the rod, one end thereof having the hook member 21 which is engaged in the aperture of the lug 18. The other end of the lever 21 is given a twist, as at 39, to provide a finger-engaging portion 40. The lever 21 is of a length stopping short approximately in the medial longitudinal axis of the handle 14' in a position for convenient manipulation of the lever.

In order that the lever 21 may be maintained in its upper or normal position, a helical spring 41 is mounted on the rod 24 interposed between the lever 21 and the cover 17. If desired, bearing washers 42 may be provided at the ends of the spring.

The operation

The operation will be readily understood from the following description.

The container 10 having been filled with batter, up to the indicator mark 14, and the follower 28, cover 12 and lever 21 in operative position on the container, and it is desired to form a doughnut.

The finger portion 40 of the lever will be in a position to receive the thumb of the hand of the operator which is supporting the machine, and with a downward pressure upon the lever, the springs 34 and 41 will be compressed by virtue of downward movement of the rod 24. The spring arms 37 will also be compressed slightly, effecting a firm grip in the notches 27 with which they are engaged. Obviously the follower 28 will be caused to move downwardly upon the batter, forcing it toward the nozzle 12. Simultaneously with the above described movement of the parts, the cone 26 will move downwardly from the edge 13 of the nozzle 12, allowing the batter to be extruded outwardly therearound. Pressure is now released from the lever 21, and the springs 34 and 41 draw the rod 24 upwardly, causing the cone 26 to move back to its closed position against the inclined edge 13. Such movement of the cone severs the batter from the nozzle 12, allowing the formed doughnut to be deposited into a cooking vessel. This operation is repeated for the formation of additional doughnuts.

During the return movement of the rod 24, the follower 28 remains stationary by reason of the pressure of spring 34 and clip 36, but as the rod is moving upwardly, tension of the arms 37 is reduced, permitting the arms to release the notches and engage the next pair of notches immediately therebelow, when the parts are in position for forming additional doughnuts.

When it is desired to refill the container, the handle 21 and cover 12 are removed, the arms 37 released from the notches of the rod 24, and by inserting a finger in each grip 32 the follower 28 may be readily withdrawn.

While I have shown and described a preferred construction, this is by way of illustration only, and I consider as my own all such modifications in structure as fairly fall within the scope of the appended claims.

I claim:

1. In a doughnut forming machine, a container having a nozzle, a cut-off means in the outer end of the nozzle, a rod on the cut-off means extended upwardly through the container, a cover for the container apertured to receive the rod therethrough, a follower within the container slidably receiving the rod, an operating lever for moving the rod downwardly to open the cut-off means, means between the follower and rod for gripping the rod during the downward movement of the rod, and means for returning the rod and cut-off means to initial position.

2. In a doughnut forming machine, a container, a handle therefor, said container having a tapering bottom wall and a discharge nozzle medially thereof, a cover for the container, a follower within the container, a cut-off means in the nozzle at the lower end thereof, a rod carried by the cut-off means and projecting upwardly through the follower and cover, a lever operatively connected to the upper portion of the rod and having a fulcrum at a point opposite the handle to effect downward movement of the rod, follower and cut-off means, spring means for returning the cut-off means and rod to initial position, means between the rod and follower for gripping the rod during the downward movement thereof, and said operating lever having a finger contacting portion stopping approximately on the medial longitudinal axis of the handle.

3. The structure of claim 1 in which the operating lever and cover are removable, and said follower being provided with finger grip means upon the upper surface thereof.

4. In a doughnut forming machine, a container, a handle therefor, said container having a tapering bottom wall and a discharge nozzle medially thereof, a cover for the container, a follower within the container, a cut-off means in the nozzle at the lower end thereof, a rod carried by the cut-off means and projecting upwardly through the follower and cover, a lever operatively connected to the upper portion of the rod and having a fulcrum at a point opposite the handle to effect downward movement of the rod, follower and cut-off means, spring means for returning the cut-off means, and rod to initial position, said rod having a plurality of oppositely disposed notches spaced longitudinally of the rod, a spring clip on the rod having inwardly directed arms complemental to respective paired notches effecting a gripping action upon the rod, a helical spring on the rod interposed between the follower and spring clip, and said operating lever having a finger contacting portion stopping approximately on the medial longitudinal axis of the handle.

5. In a doughnut forming machine, a container, a handle on one side thereof, an upstanding apertured lug on the container opposite the handle, said container having a tapering bottom wall and a discharge nozzle medially thereof, a removable cover for the container, a follower within the container, having a pair of finger grip loops upon the upper surface thereof, a guide sleeve in the nozzle, said sleeve having radially spaced arms engaged in the walls defining the nozzle, a rod slidably engaged in the sleeve, a cone-shaped member on the lower end of the rod, said nozzle having an inner circumferential edge complemental to the cone, said rod being slidably engaged through the follower and cover and having a transverse slot, the rod further having a plurality of opposed pairs of longitudinally spaced notches, a spring clip slidably mounted on the rod, said clip having a pair of inwardly directed arms, successively engageable with paired notches, a tapering helical spring on the rod interposed between the spring clip and the follower, an operating lever extended through the transverse slot of the rod, one end of the lever having a hook member for engaging the apertures of the upstanding lug, a helical spring on the rod interposed between the cover and the operating lever, and said operating lever having a finger contacting portion stopping approximately on the medial longitudinal axis of the handle.

6. The structure of claim 5 in which the tapered helical spring is fixed to the spring clip and follower.

7. The structure of claim 5 in which the container has a circumscribing indicator mark.

HUMBERT DELLA VALLE.